United States Patent [19]
Thiel

[11] 3,874,781
[45] Apr. 1, 1975

[54] COUPLER FOR OPTICAL COMMUNICATION SYSTEM

[75] Inventor: Frank L. Thiel, Painted Post, N.Y.

[73] Assignee: Corning Glass Works, Corning, N.Y.

[22] Filed: July 5, 1973

[21] Appl. No.: 376,581

[52] U.S. Cl............................ 350/96 C, 350/96 WG
[51] Int. Cl. ............................................. G02b 5/14
[58] Field of Search........... 350/96 R, 96 B, 96 WG; 250/199

[56] References Cited
UNITED STATES PATENTS

| | | | |
|---|---|---|---|
| 3,273,447 | 9/1966 | Frank | 350/96 R |
| 3,327,584 | 6/1967 | Kissinger | 350/96 B X |
| 3,455,625 | 7/1969 | Brumley et al. | 350/169 X |

Primary Examiner—John K. Corbin
Attorney, Agent, or Firm—William J. Simmons, Jr.; Clarence R. Patty, Jr.

[57] ABSTRACT

A coupler for coupling the signal in any one of a plurality of optical signal transmission lines to all of the remaining transmission lines. The coupler comprises an elongated cylindrically shaped rod of transparent material having first and second endfaces that are substantially perpendicular to the axis thereof, the second endface having a light reflecting layer disposed thereon. Support means disposes the ends of the transmission lines in a bundled arrangement in such a manner that the optical waveguides of which the transmission lines are comprised terminate adjacent to the first endface of the rod, the axes of the waveguides being substantially parallel to the longitudinal axis of the rod.

10 Claims, 5 Drawing Figures

COUPLER FOR OPTICAL COMMUNICATION SYSTEM

CROSS-REFERENCE TO RELATED APPLICATION

This application is related to U.S. patent application Ser. No. 376,575 entitled "Optical Communication System" filed by R. E. Love et al. on even date herewith assigned to the assignee of the present application.

BACKGROUND OF THE INVENTION

The continually increasing amount of traffic that communication systems are required to handle has hastened the development of high capacity systems. Even with the increased capacity made available by systems operating between $10^9$ Hz and $10^{12}$ Hz, traffic growth is so rapid that saturation of such systems is anticipated in the very near future. High capacity communication systems operating around $10^{15}$ Hz are needed to accommodate future increases in traffic. These systems are referred to as optical communication systems since $10^{15}$ Hz is within the frequency spectrum of light. Conventional electrically conductive waveguides which have been employed at frequencies between $10^9$ and $10^{12}$ Hz are not satisfactory for transmitting information at carrier frequencies around $10^{15}$ Hz.

The transmitting media utilized in the transmission of frequencies around $10^{15}$ Hz are hereinafter referred to as optical signal transmission lines or merely transmission lines which may consist of a single optical waveguide or a bundle thereof. Optical waveguides normally consist of an optical fiber having a transparent core having a refractive index $n_1$ surrounded by a layer of transparent cladding material having a refractive index $n_2$ which is lower than $n_1$. Although the theory of optical waveguides has been known for some time, practical optical waveguides that do not absorb an excessive amount of transmitted light have been developed only recently. For example, U.S. Pat. No. 3,659,915 discloses a low loss optical waveguide comprising a cladding layer of fused silica and a core of fused silica doped with one or more materials that selectively increase the index of refraction of the core above that of the cladding.

To establish an optical communication system between a plurality of stations, a variety of interconnection schemes may be utilized. Each station can be "hard wired" to every other station, but when many stations must be interconnected, the excessive amount of optical signal transmission line required causes this method to be undesirable due to both the cost of the transmission line and the space consumed thereby. The stations may be interconnected by a loop data bus which drastically reduces the required amount of optical signal transmission line, but the large number of couplers required in such a system introduces an excessive amount of loss, especially in those systems in which there are many stations.

The optical communication network disclosed in said related patent application takes advantage of unique properties of optical signal transmission lines and enables the interconnection of a plurality of stations with much less transmission line than that which would be required by hard wiring, and yet it is not plagued by the losses encountered in the aforementioned loop data bus. Briefly, the communication network disclosed in said related application consists of a number of stations, all of which are connected by separate optical signal transmission lines to a common passive coupler which is adapted to receive an optical signal from one of the stations and couple a portion thereof to the optical signal transmission line associated with each of the other stations. The coupler employed in this system should couple light from each optical signal transmission line to the remainder of such transmission lines and should introduce a minimum of loss into the system.

SUMMARY OF THE INVENTION

It is therefore an object of the present invention to provide a low loss light coupler for interconnecting a plurality of optical signal transmission lines.

Briefly, the present invention relates to a passive coupler for use in an optical communication system having a plurality of optical signal transmission lines each comprising at least one optical waveguide having a core of transparent material surrounded by a layer of transparent cladding material having a refractive index is lower than that of the core material. The function of this coupler is to couple the optical signal in any one of the transmission lines to all of the remaining transmission lines. The coupler comprises an elongated rod of transparent material having first and second planar endfaces that are substantially perpendicular to the longitudinal axis thereof. Means is disposed on the second endface for reflecting light, the wavelength of which is to be transmitted by the optical signal transmission lines. Support means are provided for disposing the ends of the optical signal transmission lines in a bundled, parallel arrangement. The optical waveguides of which the transmission lines are comprised terminate in polished ends that are substantially perpendicular to the axes of the waveguides, the waveguide ends being disposed in a planar array adjacent to the first endface.

As used herein, the word "transparent" indicates transparency to those wavelengths of light that are transmitted by the associated optical signal transmission lines.

DESCRIPTION OF THE PREFERRED EMBODIMENTS

Figure 1:
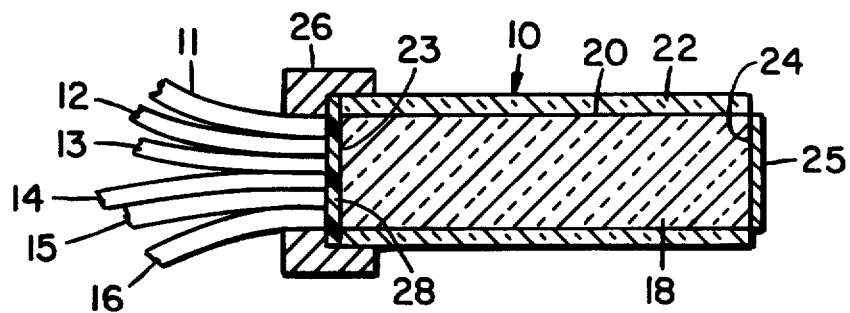
FIG. 1 is a cross-sectional view of an optical signal coupler constructed in accordance with the present invention.

FIG. 1 is a cross-sectional view of a passive optical signal coupler 10 used for interconnecting a plurality of optical signal transmission lines 11 through 16. Coupler 10 consists of an elongated mixer rod 18 of transparent material, the refractive index $n_3$ of which is preferably the same as that of the cores of the optical waveguides employed in optical signal transmission lines 11–16. Rod 18 is preferably in the shape of a cylinder of circular cross section, but other suitable cross-sectional shapes may be employed. If optical waveguides such as those disclosed in the aforementioned U.S. Pat. No. 3,659,915 were utilized in the optical signal transmission lines 11–16, rod 18 could consist of doped fused silica having a refractive index equal to that of the waveguide cores or some other material having a similar refractive index. The outer surface of rod 18 should cooperate with the surrounding medium to provide an optical quality interface 20 for reflecting back into the rod any light that is incident thereon. Such an interface is preferably provided by a layer 22 of transparent cladding material having a refractive index $n_4$ sufficiently lower than that of rod 18. Interface 20 could also be provided by polishing the surface of rod 18 and utilizing air as the low index surrounding medium or by disposing on the surface of rod 18 a dielectric or metallic layer which is reflective to the wavelengths of light transmitted by the optical signal transmission lines. Endfaces 23 and 24 of rod 18 are polished and are substantially perpendicular to the longitudinal axis of rod 18. Endface 24 is provided with a layer 25 of metal such as aluminum or silver, or it is coated with dielectric materials in a well known manner to form a mirror which reflects those wavelengths of light that are transmitted by the optical signal transmission lines. Support means 26 maintains transmission lines 11–16 in alignment with rod 18 so that the ends of the transmission lines are disposed within a region defined by the circumference of endface 23, thereby causing the light emitted by each of the transmission lines to be incident upon the endface 23. Support means 26 also maintains the longitudinal axis of each transmission line substantially parallel to that of rod 18. A layer 28 of index matching fluid may be disposed between the ends of the transmission lines and the end of rod 18. If layer 28 is employed, the waveguide faces need not be polished.

If a transparent cladding layer is employed to form interface 20, the refractive index of that layer must be sufficiently lower than that of rod 18 so that the numerical aperture of coupler 10 is at least as large as that of the optical signal transmission lines. If the refractive index of the rod 18 is substantially the same as that of the cores of the optical waveguides which comprise the optical signal transmission lines 11–16, the refractive index of cladding layer 22 should be no greater than that of the cladding of said optical waveguides.

Figure 2:
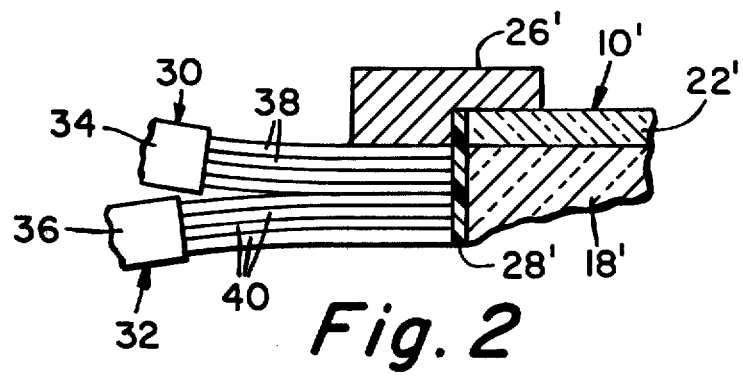
FIGS. 2 and 3 are enlarged, fragmentary views illustrating the connection of various types of optical signal transmission lines to the coupler of FIG. 1.
Figure 3:
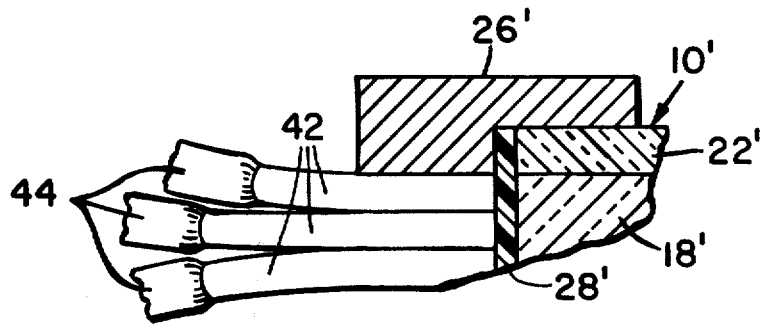

FIGS. 2 and 3 are enlarged, fragmentary views of the input end of coupler 10 illustrating the connection of multifiber bundles and single optical waveguides to the coupler. In these figures elements similar to those of FIG. 1 are indicated by primed reference numerals. In FIG. 2, multifiber bundles 30 and 32 are shown connected to the end of coupler 10'. Jackets 34 and 36 are removed from the ends of the bundles, and the exposed end portions of optical waveguides 38 and 40 extend to rod 18' and are maintained in proper alignment therewith by support means 26'. The removal of jackets 34 and 36 increases the packing fraction of the group of optical signal transmission lines at their plane of termination adjacent to rod 18'.

Referring to FIG. 3, a plurality of optical waveguide fibers 42 are shown terminating adjacent to rod 18'. After removing protective jackets 44 the ends of waveguides 42 are connected to the end of rod 18' in a manner similar to that described in connection with FIG. 2.

Figure 4:
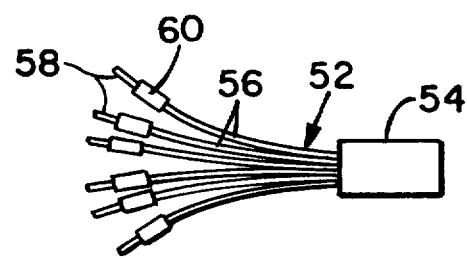
FIG. 4 is a modification of the embodiment illustrated in FIG. 1.

In the embodiments illustrated in FIGS. 1, 2 and 3, the optical signal transmission lines are adapted to extend from the coupler 10 to some distant station (not shown). In those embodiments the optical signal transmission lines which are to be connected to the coupler are suitably grouped and maintained in parallel alignment while the ends of the optical waveguides of which the transmission lines are comprised are ground and polished so that each waveguide terminates in an endface that is substantially perpendicular to the axis thereof, and all of the waveguide endfaces lie in a single plane. In the embodiment illustrated in FIG. 4 a short bundle 52 of optical waveguides is disposed adjacent to coupler 54 in the manner described in connection with the embodiments of FIGS. 1–3. One or more of the fibers are then separated from bundle 52 to form short lengths of optical signal transmission lines 56, each of which is connected to longer lengths of optical signal transmission lines 58 by coupling means 60 which may be of the type disclosed in copending application Ser. No. 376,577 entitled "Optical Waveguide Connector" filed on even date herewith assigned to the assignee of the present application. Although coupling means 60 introduces some loss into the system, the embodiment of FIG. 4 may be preferred in that it can be manufactured under controlled conditions whereas the embodiments illustrated in FIGS. 1–3 may require assembly at the point of connection of a plurality of optical signal transmission lines.

Figure 5:
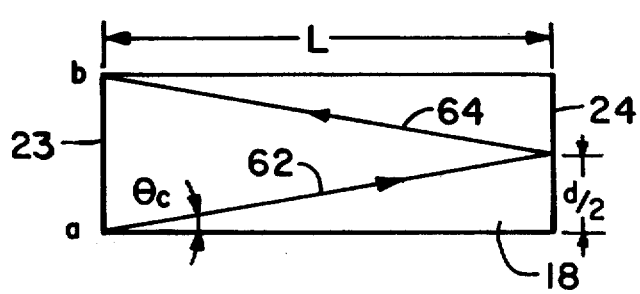
FIG. 5 is a diagram which is useful in determining the minimum length of the coupler of the present invention.

Proper coupler operation requires that a portion of the optical signal propagating in any one of the optical signal transmission lines connected to the coupler must be coupled to each of the remaining optical signal transmission lines. Reference is made to FIG. 5 which shows a diagram that is useful in the calculation of the minimum length L of a cylindrical mixer rod having a circular cross-section. Rod 18 should be long enough to be an efficient mixer, i.e., it should be long enough to insure that radiation from a given waveguide fiber illuminates all of the other fibers. To satisfy this condition, rod 18 must be long enough to reflect some portion of the light radiating from a first peripherally disposed optical waveguide e.g., one at point $a$, to a second optical waveguide that is diametrically disposed at endface 23 with respect to the first waveguide, i.e. one at point $b$. The first waveguide radiates an extreme ray 62 that must reflect from the center of endface 24 to form reflected ray 64 which illuminates the second waveguide. The angular deviation $\theta_c$ of ray 62 with respect to the axis of the first waveguide is known as the acceptance half angle of the waveguide. Since the end portions of the waveguides are parallel to the axis of rod 18, the angle $\theta_c$ can also be measured with respect to the axis of the rod. The angle $\theta_c$ is given by the equation $$\theta_c = \sin^{-1} \sqrt{n^2_1 - n^2_2}/n_3$$

The minimum length $L_m$ which satisfies the aforementioned requirement of illumination of diametrically opposed waveguides is given by the equation $$L_m = d/2 \tan \theta_c$$

where $d$ is the diameter of rod 18 as required by the maximum cross-sectional dimension of the bundle of waveguides terminating at endface 23. A mixer rod having a length longer than length $L_m$ will also provide proper illumination of all waveguides coupled thereto.

I claim:

1. In an optical communication system having at least three optical signal transmission lines each comprising at least one optical waveguide having a core of transparent material having a refractive index $n_1$ surrounded by a layer of transparent cladding material having a refractive index $n_2$ that is lower than $n_1$, a coupler for coupling the signal in any one of said optical transmission lines to all of the remaining optical transmission lines, said coupler comprising an elongated rod of transparent material of refractive index $n_3$ having an outer side surface and first and second planar endfaces that are substantially perpendicular to the longitudinal axis thereof, the length L of said rod satisfying the equation $$L \geq d/2 \tan \theta_c$$

where $d$ is the diameter of said rod and the angle $\theta_c$ is the acceptance half angle of said at least one optical waveguide, means surrounding said rod and cooperating with said outer side surface thereof for forming an interface for reflecting back into said rod light from said transmission lines that impinges upon said side surface, means disposed on said second endface for reflecting light, the wavelength of which is to be transmitted by said optical signal transmission lines, and support means for disposing the ends of said optical signal transmission lines in a bundled, parallel arrangement, the optical waveguides of which said transmission lines are comprised terminating in faces that are disposed in a substantially planar array adjacent to said first endface.

2. An optical communication system in accordance with claim 1 wherein said means surrounding said rod comprises a layer of transparent cladding material disposed upon the surface of said rod, the refractive index $n_4$ of said cladding material being lower than $n_3$.

3. An optical communication system in accordance with claim 2 further comprising a layer of refractive index matching fluid disposed between the ends of said optical waveguides and said first endface.

4. An optical communication system in accordance with claim 3 wherein the refractive index $n_1$ of said optical waveguide cores and the refractive index $n_3$ of said rod are substantially equal.

5. An optical communication system in accordance with claim 4 wherein the numerical aperture of said coupler is at least as large as that of said optical waveguides.

6. An optical communication system in accordance with claim 1 wherein said waveguide faces are polished and are substantially perpendicular to the axes of said waveguides.

7. An optical communication system in accordance with claim 1 wherein each of said optical signal transmission lines comprises a plurality of optical waveguides surrounded by a protective jacket, said jacket terminating near said ends of optical waveguides to expose portions of said optical waveguides that are engaged by said support means.

8. An optical communication system in accordance with claim 1 wherein said optical waveguide cores and said rod consist of doped fused silica.

9. An optical communication system in accordance with claim 1 wherein the ends of said optical signal transmission lines remote from said coupler terminate at an optical signal coupling means.

10. An optical communication system in accordance with claim 1 further comprising a plurality of optical signal transmission lines equal in number to said at least three optical signal transmission lines, the lengths of said plurality of optical signal transmission lines being greater than the lengths of said at least three optical signal transmission lines, and optical signal coupling means for coupling light between each of said at least three optical signal transmission lines and a respective one of said plurality of optical signal transmission lines.

* * * * *